Figures 1, 2:
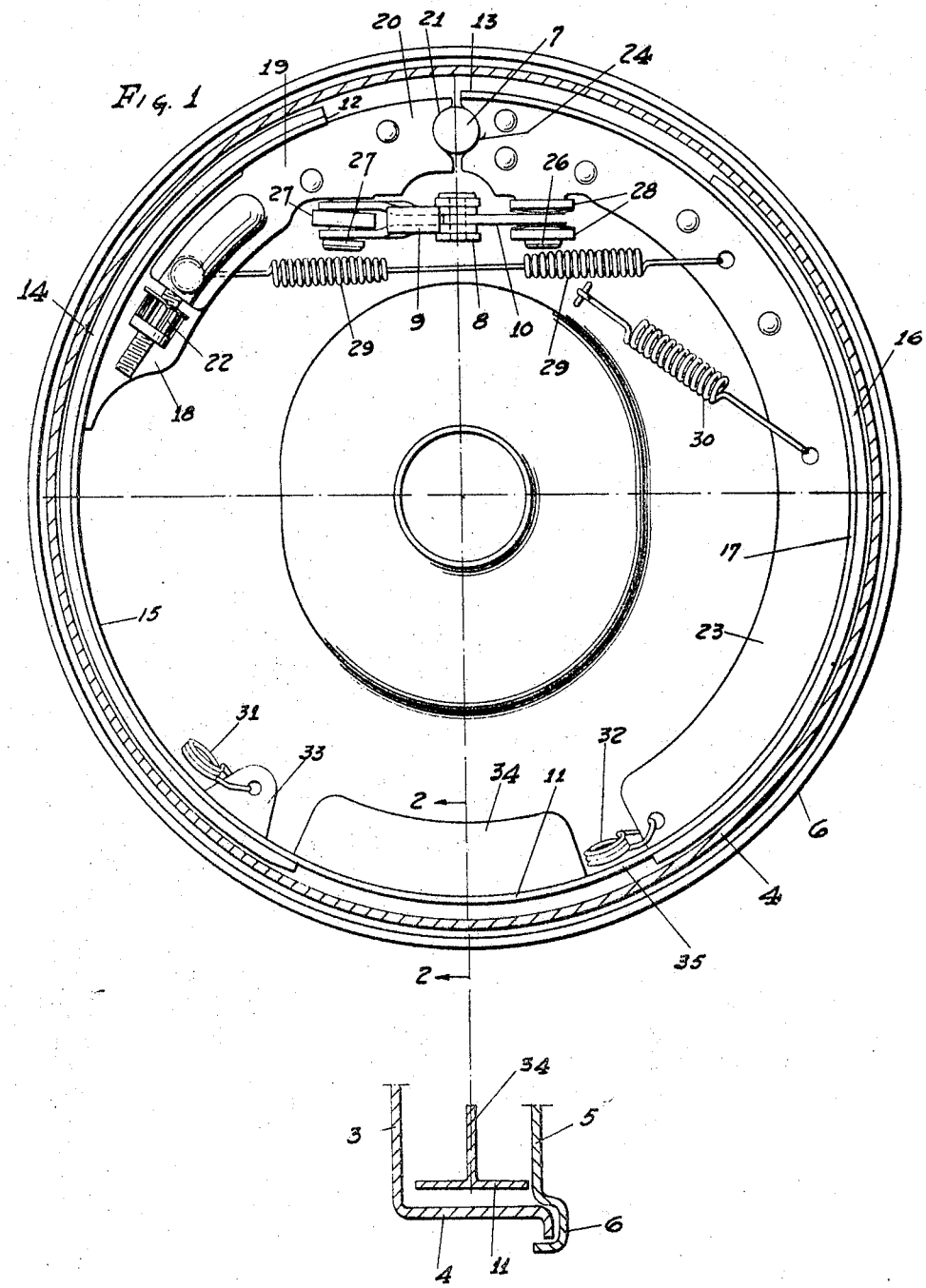

April 3, 1934.  W. G. STONER  1,953,572
BRAKE
Filed Dec. 29, 1932

INVENTOR
WILLIS GORDON STONER.
BY
Louis W. Helmuth
ATTORNEY

UNITED STATES PATENT OFFICE 1,953,572

BRAKE

Willis Gordon Stoner, Detroit, Mich., assignor to The Midland Steel Products Company, Cleveland, Ohio, a corporation of Ohio Application December 29, 1932, Serial No. 649,371

2 Claims. (Cl. 188—78)

This invention relates to new and useful improvements in brakes and more particularly to the shoe structure thereof.

An important object of the invention is to provide a one piece flexible brake shoe or band, in which flexure is controlled or refined to enhance the action of the brake in both forward and reverse with the use of less lining material than heretofore used.

Another important object of the invention is to provide a one piece band with a portion having a greater range of flexibility in one direction of operation to thereby increase its serving action to the more rigid section, the latter section by the same token, having its range of movement increased especially in the opposite direction of operation as when rotation is primarily retarded by the more rigid section.

A further object of the invention is to provide a shoe structure which reduces pedal effort appreciably and at the same time provides for a more uniform contact of the lining with the drum both in forward and reverse directions.

Another object of the invention is to provide a one piece brake band constructed to render substantially one-half thereof a rigid shoe and the other half thereof a flexible shoe with a portion of the band integrally connecting the two shoes and constructed so as not to require the use of lining material on the intermediate portion of the band.

Other objects and advantages of the invention will become apparent during the course of the following description.

In the accompanying drawing forming a part of the application and wherein like numerals are employed to designate like parts throughout the several views, Fig. 1 is a vertical sectional view through a brake drum and brake mechanism embodying the present invention, Fig. 2 is a transverse section through a portion of the same taken on the line 2—2 of Fig. 1.

Referring to the drawing, the numeral 3 designates a brake drum having the usual axial annular flange 4, against the inner surface of which the brake shoe to be presently described is adapted to engage during application of the brake mechanism. The inner open side of the drum is closed by a backing plate 5 suitably secured to the axle or steering knuckle and having a flange 6 embracing the radial flange of the drum to exclude extraneous matter but with sufficient clearance to permit free rotation of the drum. This backing plate also has rigidly affixed thereto, an anchor pin 7 which is adapted to take the braking torque in either direction of rotation of drum. Slightly below this anchor pin, the backing plate is provided with an aperture, not shown, through which one end of a brake operated flexible cable 80 extends into the drum and is there provided with a cleavis 8 pivotally connected to the elbow of a pair of toggle links 9 and 10, employed for moving either end of the brake shoe into frictional engagement with the drum as will be more fully set forth hereinafter. While the brake shoe may be operated by any other desired brake operating mechanism, it is here illustrated in the form of a toggle mechanism for convenience and in view of its adaptability to the type of brake band herein disclosed.

The brake shoe structure comprises a one piece resilient steel band or annulus 11 of T-shape cross section and divided at one point transversely of its circumference to provide the same with spaced ends 12 and 13, adjacent the anchor pin 7. The outer surface of the band 11 provides the lining supporting portion. Heretofore, in this type of band, the lining material extended substantially entirely around the band including that portion of the band diametrically opposite the anchor pin. In the present type of band a considerable saving of lining material is effected by leaving the middle portion of the band devoid of lining material. Accordingly, a piece of lining material 14 is secured to a flexible side 15 of the band and extends from its free end to a point approximately 15 degrees from a line bisecting the centers of the anchor pin and drum and a slightly shorter segment 16 of brake lining is secured in any suitable manner to the rigid side 17 of the band and extends from a point spaced from the free end of the rigid side to approximately 15 degrees from the line bisecting the centers of the anchor and drum. Considering the unlined portions of the annular brake shoe, it will be apparent that approximately one-sixth of the circumference is devoid of brake lining material, which effects a tremendous saving in the cost of manufacture of the brake in quantities without sacrificing satisfactory performance. The end of the flexible portion 15 of the band or shoe has an inward radially extending rib 18 which is straddled by a circumferentially movable adjustor 19 extending beyond the free end of the band as at 20 and is provided at its outer end with an arcuate seat 21 conforming to the contour of the anchor pin for transferring the braking torque to the anchor when the drum rotates in a clockwise direction. This adjustor 19 is controlled by a screw device 22 as explained in the Sneed Patent No. 1,789,392 of January 20, 1931.

The end 17 of the brake band is rendered substantially rigid to act substantially in the capacity of a rigid shoe by means of an inward radially projecting rib 23, extending from the free end 13 of the band to a point where the segment of lining 16 terminates adjacent the middle of the band or at a point approximately 15 degrees from a line bisecting the centers of the anchor and drum. The free end of rib 23 adjacent the anchor is provided with an arcuate seat 24 adapted to engage the anchor and transfer the braking torque thereto when the drum revolves in a counter clockwise direction.

In order to connect the toggle mechanism with the two ends of the band, a toggle pin 25 is secured to the adjustor 19 and a similar pin 26 to the radial rib 23 adjacent their anchor engaging ends. The two armed toggle link 9 is pivotally connected to the toggle pin 25 with a roller 27 disposed between the arms thereof to provide rolling contact with the backing plate 5, while toggle arm 10 is pivotally connected with toggle pin 26 with rollers 28 arranged above and below the toggle link for rolling contact with the backing plate 5. Whenever the brake cable is operated to apply the brake, the elbow of the toggle link tends to straighten out and move one or the other of the ends of the brake band away from the anchor pin, depending upon the direction of rotation of the drum. The brake band is returned to its normal release position with its ends engaging the anchor pin by means of interconnected retractor springs 29 which in turn are connected to the two ends of the band as illustrated. A second spring 30 has one end connected to the rib 23 of the rigid side of the band in chordal relation and its other end connected to the backing plate adjacent the spring 29 so that greater effort is required to move the rigid end of the shoe than the flexible end with the result that the latter is induced to move away from the anchor pin 7 first to engage its lining with the drum.

In order to floatingly mount the brake band, to prevent lateral shifting movement thereof and to center the band in brake release position, a pair of hairpin coil springs 31 and 32 are provided, the former having one end connected to the backing plate and its other end engaged with an inward radially projecting lug 33 provided on the flexible side 15 of the band adjacent the end of the lining 14. The other spring device 32 has one end also connected to the backing plate adjacent the end of the lining material 16 and its other end connected to the end of the radial rib 23.

In order to properly control the action of the flexible side 15 of the band serving the rigid side 17 and to provide for increased flexibility of a portion of the band adjacent the end of the rigid side 17 whereby the latter will more readily move into engagement with the drum as a unit while still imparting a slight amount of servo action to the more flexible side, an inward radially extending segmental rib 34 is provided at approximately the middle of the band and extends from approximately the end of the lining 14 on the flexible side 15 to a point spaced a variable distance from the end of rib 23 adjacent the middle of the band. This portion of the band left flexible, is defined between the ribs 23 and 34 and is designated by the numeral 35.

While the ribs 18, 23 and 34 may be separate elements and attached to the band in any suitable manner, it is desired that they may be made integral with the band of T-shaped cross section. Accordingly, in the preferred form of the device, portions of the leg of the T-shaped band are cut away wherever it is desired to impart flexibility to the band and this also applies to the provision of spring lug 33. The ribs 23 and 34 are illustrated as being of uniform height, but it will be understood that they may progressively decrease in height from either or both ends or from their medial portions to the ends to obtain varying degrees of flexibility in various portions of the band.

It is to be understood that various changes in the size, shape and arrangement of parts may be resorted to without departing from the spirit of the invention or the scope of the appended claims.

I claim:

1. A one piece split brake band having a lining carrying portion, said band having a circumferential radial rib extending from one free end to a point adjacent the middle of the band to provide a comparatively rigid section, the other half of the band being devoid of reinforcement to provide a comparatively flexible section, the middle of the band having an integral reinforcing rib spaced from the first named rib, and the middle of the band being devoid of lining material.

2. In a brake, a drum, a one piece divided brake band with an anchor between the ends thereof, one end of the band engaging the anchor in one direction of drum rotation and the other end of the band engaging the anchor in the opposite direction of drum rotation, substantially one half of the band being substantially rigid and the other half being substantially flexible, the flexible and rigid sections of the band being provided with lining material and the integral portion of the band between said flexible and rigid sections being devoid of lining material and stiffened with a radial reinforcing rib from the flexible section up to a point spaced from the rigid section of the band.

WILLIS GORDON STONER.